(12) United States Patent
Lawrence

(10) Patent No.: US 7,172,828 B2
(45) Date of Patent: Feb. 6, 2007

(54) FUEL CELL SYSTEM

(76) Inventor: Jeremy Carl Lawrence, Waagestrasse 1, Neubrandenburg 17033 (DE)

( * ) Notice: Subject to any disclaimer, the term of this patent is extended or adjusted under 35 U.S.C. 154(b) by 0 days.

(21) Appl. No.: 11/138,341

(22) Filed: May 27, 2005

(65) Prior Publication Data
US 2005/0277006 A1 Dec. 15, 2005

(30) Foreign Application Priority Data
Jun. 15, 2004 (DE) .................. 10 2004 028 809

(51) Int. Cl.
H01M 8/04 (2006.01)
(52) U.S. Cl. .......................... 429/26; 429/20
(58) Field of Classification Search ................. None
See application file for complete search history.

(56) References Cited

U.S. PATENT DOCUMENTS

| | | | |
|---|---|---|---|
| 5,783,872 A | 7/1998 | Blair et al. | |
| 6,255,008 B1 * | 7/2001 | Iwase | 429/9 |
| 6,555,989 B1 * | 4/2003 | Pearson | 320/101 |
| 2002/0064697 A1 * | 5/2002 | Sugiura et al. | 429/23 |
| 2002/0168560 A1 | 11/2002 | Mukerjec et al. | |
| 2003/0027021 A1 | 2/2003 | Sharivker et al. | |
| 2003/0170515 A1 * | 9/2003 | Wang et al. | 429/20 |

FOREIGN PATENT DOCUMENTS

| | | |
|---|---|---|
| EP | 1 271 684 A2 | 1/2003 |
| EP | 1 376 730 A1 | 1/2004 |

OTHER PUBLICATIONS

J.D. Holladay et al., Power Generation Using a Mesoscale Fuel Cell Integrated With a Microscale Fuel Processor; Journal of Power Sources, Elsevier, Amsterdam, NL; BD. 130, NR. 1-2; May 3, 2004, pp. 111-118, XP004500856, ISSN: 0378-7753; p. 116, Paragraph 3.3.

* cited by examiner

Primary Examiner—John S. Maples
(74) Attorney, Agent, or Firm—David S. Safran

(57) ABSTRACT

A fuel cell system which has a high temperature fuel cell stack (1) with current diverters (5) and a reformer and/or an afterburner (6), the current diverters (5) being connected with low temperature connecting elements (10) for current delivery. The current diverters (5) are in thermal contact with the reformer and/or afterburner (6) between the high temperature fuel cell stack (1) and the low temperature connecting elements (10). The thermal contact prevents cooling of the HTFC stack 1 on its ends in the vicinity of the connecting points of the current diverters (5) and ensures effective conversion and uniform transport of the fuel.

8 Claims, 1 Drawing Sheet

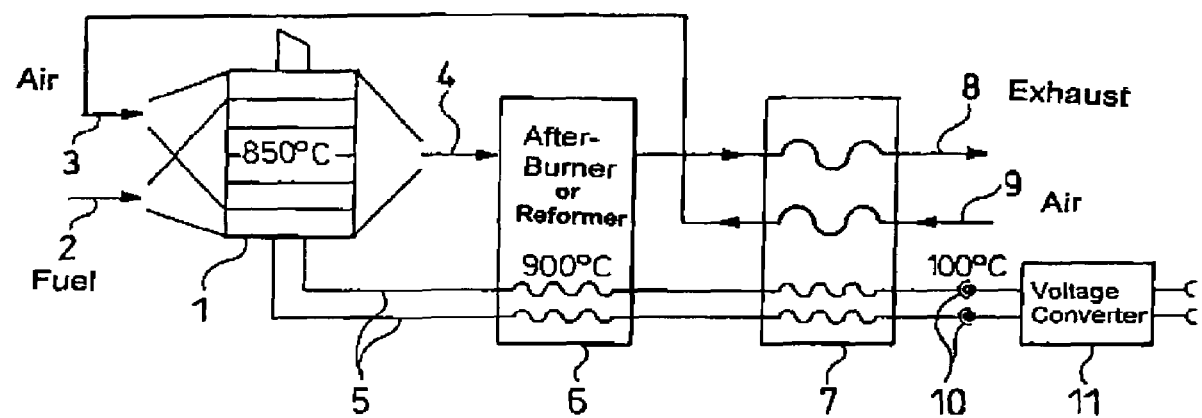

FUEL CELL SYSTEM

BACKGROUND OF THE INVENTION

1. Field of Invention

The invention relates to a fuel cell system which has a high temperature fuel cell stack with current diverters and a reformer and/or an afterburner, the current diverters on making contact with low temperature connecting elements.

2. Description of Related Art

Fuel cells are used for direct electrochemical conversion of a combustion gas and an oxidizer into the corresponding reaction products with release of electrical energy. The combustion gas and the oxidizer are collectively called the working stock. A fuel cell system is generally an arrangement which, in addition to one or more fuel cells which are interconnected into a so-called fuel cell stack, has other components such as, for example, a reformer, afterburner or electronic units for control of the system or for conversion of the generated voltage. A reformer is used to produce hydrogen-containing combustion gas from generally liquid, easily handled and readily available fuel, such as, for example, gasoline or diesel fuel which is supplied to the anode of the fuel cell. Fuel cells, in general, do not completely convert the combustion gas. The reaction products are then conventionally supplied to an afterburner where they are burned before they are released as an exhaust gas into the environment.

There are different types of fuel cells which differ in the electrolyte used for ion conduction. The temperature at which the fuel cell can be operated depends on the electrolyte material used. The solid oxide fuel cell (SOFC), which is operated at 800° C. to 1000° C., and the molten carbonate fuel cell (MCFC), which is operated at roughly 650° C., have the highest operating temperatures. These two types of fuel cells are collectively called high temperature fuel cells (HTFC) below.

To carry off the current produced by the fuel cells, current diverters lead from the fuel cell stack to the connecting elements to which, frequently, an electronic converter unit (DC-DC converter) is connected for conversion of the voltage, and optionally, for its stabilization. The temperature of the connecting elements should not exceed a given maximum value which is roughly 100° C. in order not to overheat the connected converter unit. Thus, one end of the current diverter has the high temperature of the HTFC, while the other end is kept at the lower temperature of the connecting element.

The high electrical conductivity which is desired for the current conduction of the diverters is accompanied by a correspondingly high thermal conductivity according to the Wiedemann-Franz law. The great temperature difference between the ends of the current diverters thus leads to conduction of heat from the high temperature fuel cell stack to the low temperature connecting elements. On the connecting elements, this heat is ordinarily dissipated by suitable cooling measures in order to prevent overheating of the connecting elements above the maximum allowable temperature. On the fuel cell stack, the removed heat results in local cooling (cold spot) in the vicinity of the connecting points. These cold spots are disadvantageous for efficient operation of the fuel cells. On the one hand, fuel utilization is less effective on the cold spot itself, and on the other hand, any temperature nonuniformity leads to a variation in the continued transport of the fuel within the fuel cells; this likewise reduces the efficiency of the fuel cell stack.

SUMMARY OF THE INVENTION

Therefore, a primary object of the present invention is to devise a fuel cell system based on a high temperature fuel cell stack in which no heat from the high temperature fuel cell stack is dissipated via the current diverters, and thus, cooling of the fuel cell stack in the vicinity of the connecting points of the current diverters is prevented.

This object is achieved as in accordance with the invention by a fuel cell system in which the current diverters are in thermal contact with the reformer and/or afterburner in at least one contact point between the high temperature fuel cell stack and the low temperature connecting elements.

Reformers and afterburners conventionally work at temperatures which are above the operating temperatures of a high temperature fuel cell. Because the current diverters are brought into thermal contact with an element which is hotter than the fuel cell stack, heat dissipation from the fuel cell stack is avoided.

Suitable dimensioning of the diverter length, the diameter, the choice of material and the quality of the thermal contact can optimally result in that heat is not transported either into or out of the fuel cell stack via the diverters during operation, and at the same time, the heat flow to the connecting elements rises only slightly.

Another advantage of the invention arises during the heat-up phase of the high temperature fuel cell stack. The fuel cell stack is heated to the operating temperature conventionally first by the afterburner, and if present in the system, also the reformer, being started, the combustion gas being routed directly into the afterburner, bypassing the fuel cell stack. The heat produced by the reformer and/or the afterburner is then supplied by means of a heat exchanger via an air flow to the fuel cell stack and heats it to the operating temperature. According to the invention, a heat flow takes place from the reformer and/or the afterburner through the current diverter to the fuel cell stack and supports the heat-up.

The invention is explained detail below with reference to one embodiment of the invention and the accompanying figure of the drawings.

BRIEF DESCRIPTION OF THE DRAWINGS

The sole FIGURE shows a block diagram of one embodiment of the proposed fuel cell system.

DETAILED DESCRIPTION OF THE INVENTION

The fuel cell system shown in the FIGURE has a high temperature fuel cell stack (HTFC stack) 1, with a combustion gas supply 2, a cathode air supply 3, an exhaust gas channel 4 and current diverters 5. The exhaust gas channel 4 is connected to the gas exhaust 8 via an afterburner 6 and a heat exchanger 7. The cathode air supply 3 of the HTFC stack 1 is connected to the air supply 9 via the heat exchanger 7. The current diverters 5 of the HTFC stack 1 are routed via the afterburners 6 and the heat exchanger 7 to the low temperature connecting elements 10 where they make contact with a converter unit 11 for conversion of the voltage of the current delivered from the HTFC stack 1.

In the schematic, the HTFC stack 1 is shown as a serially interconnected fuel cell stack, separating plates connecting the anode of one fuel cell to the cathode of the next fuel cell, and at the same time being used for fuel distribution. On the two ends of the HTFC stack 1, there are end plates which are made analogously to the separating plates and to which the current diverters 5 are connected. This arrangement is given simply by way of example. The invention is independent of the exact execution of the HTFC stack 1 and can be applied to any arrangement or interconnection of one or more high temperature fuel cells. The operating temperatures of different components of the fuel cell system which are given below are typical for a solid oxide fuel cell system (SOFC) and can likewise be regarded as exemplary.

The HTFC stack 1 works at an operating temperature of 850° C. This high temperature is necessary to achieve sufficient ion conduction of the electrolyte used. The operating temperature is maintained essentially by the exhaust heat generated by the HTFC stack 1 in operation itself. In addition, the air which is added via the cathode air supply 3 and which is used as the oxidizer is preheated. For this purpose, heat from the exhaust gases of the HTFC stack 1 in the heat exchanger 7 is transferred to the supplied air. Analogously thereto, the combustion gas supplied via the combustion gas supply 2 could be preheated. Often however, the combustion gas is produced from a liquid fuel which can be easily handled and transported. The reformer which is used for this purpose and which is not shown here uses a reforming reaction, such as, for example, so-called partial oxidation, and works at temperatures above 1200° C. In this case, the combustion gas is already preheated as a result of the reforming reaction.

The exhaust gas of the HTFC stack 1 which is collected in the exhaust gas channel 4 could be supplied directly to the heat exchanger 7 and then to the gas exhaust 8. However, often, it contains still usable residual combustion gases which must be re-burned before they can be released as exhaust into the environment. The afterburner 6 is used for this purpose; it works typically at 900° C., i.e., therefore, at temperatures slightly above the operating temperature of the HTFC stack 1.

The current diverters 5, which are connected to the HTFC stack 1, end in the low temperature connecting elements 10. These low temperature connecting elements 10 could be directly accessible externally in order to be able to connect electrical consumers. However, often in the fuel cell system, there are components with which, for example, the voltage of the delivered current can be changed or stabilized or which are used for system control. In this embodiment, a voltage converter unit 11 is provided as one such component for transformation of the voltage. In any case, the temperature of the low temperature connecting elements 10 for protection of the connected components should not exceed a maximum temperature of roughly 100° C.

In a direct connection of the HTFC stack 1 to the low temperature connecting elements via the current diverters 5, according to the prior art, the great temperature difference of more than 750° C. leads to the desired good electrical conductivity of the current diverters 5 being accompanied by unwanted conduction of heat from the HTFC stack 1 to the low temperature connecting elements 10. Since the electrical and thermal conductivity are inseparably connected to one another, this undesirable heat flow cannot be excluded. It can be easily influenced simply by the material choice for the current diverters 5. For example, high quality steels are a suitable material since, in the temperature range used, they are resistant to oxidation, and at the same time, have a favorable ratio of electrical to thermal conductivity.

In accordance with the invention, the current diverters 5 are in thermal contact with the afterburner 6. In the illustrated example, thermal contact is established by the current diverters 5 being routed through a gas flow within the afterburner 6. In addition, to achieving good heat conduction, the surface of the current diverters 5 in the afterburner 6 can be increased by their being made helical or having heat transfer elements. By this thermal contact, the current diverters 5 on their route to the low temperature connecting elements 10 are brought to a temperature which is greater than or equal to the temperature of the HTFC stack 1. This ensures that heat is not dissipated from the HTFC stack 1 in the direction of the low temperature connecting elements 10. Cooling of the end plates of the HTFC stack can thus be eliminated. Optimally, the thermal contact of the current diverters 5 with the afterburner 6 is chosen such that, together with the heat losses by heat radiation or heat dissipation of the current diverters 5 to their vicinity, the temperature gradient in the current diverters 5, at the connecting point to the HTFC stack 1, is exactly zero. Then, during operation, heat is routed neither into nor out of the HTFC stack 1. Due to the temperature of the afterburner 6 which is slightly elevated compared to the HTFC stack 1 and the length of the current diverters 5 which is shorter under certain circumstances between the afterburner 6 and low temperature connecting elements 10 as compared to the diverter length between the stack 1 and the low temperature connecting elements 10, the temperature gradient in the segment between the afterburner 6 and the low temperature connecting elements 10 rises due to the thermal contact of the invention between the current diverters 5 and the afterburner 6. This leads to an elevated heat flow into the low temperature connecting elements 10. However, the increased heat flow can be minimized by choosing the length of the current diverters 5 between the HTFC stack 1 and afterburner 6 to be short as compared to the length of the current diverters 5 between the afterburner 6 and low temperature connecting elements 10 by a suitable geometrical arrangement of the components.

Moreover, in accordance with the invention, there is thermal contact between the current diverters 5 and the heat exchanger 7. Thermal contact with the heat exchanger 7 prevails preferably in the immediate vicinity of the air supply 9. In this way, the current diverters 5 are cooled down to a temperature which, in the most favorable case, is below the allowable maximum temperature of the low temperature connecting elements 10. Cooling of the low temperature connecting elements 10 which goes beyond this, for example, by an additional fan, can thus be entirely omitted under certain circumstances or can be dimensioned to be smaller.

For various reasons, the illustrated arrangement is suitable for increasing the effectiveness of the fuel cell system. First of all, cooling of the HTFC stack 1 on its ends is avoided in the vicinity of the connecting points of the current diverters 5. In this way, effective conversion of the combustion gas and uniform transport of the fuel are ensured.

Second, the net heat transport within the current diverters 5 runs from the afterburner 6 to the HTFC stack 1 and from the afterburner 6 via the heat exchanger back again to the HTFC stack 1. The heat routed via the current diverters 5 is thus, in any case, supplied again to the HTFC stack 1, and thus, the system itself; this leads to higher system efficiency.

Third, the illustrated arrangement is advantageous in the heat-up phase of the system. The heat flow when the HTFC stack 1 heats up runs from the afterburner 6 via the heat exchanger 7 and the cathode air to the HTFC stack 1. The heat flow in the current diverters 5 thus supports heat up of the HTFC stack 1 in this phase.

If there is a reformer in the fuel cell system, the reformer can be in thermal contact with the current diverters 5 instead of the afterburner 6 or parallel to the afterburner 6. Since the reformer is likewise operated conventionally at temperatures which are above the operating temperatures of the HTFC stack 1, the thermal contact of the current diverters 5 with the reformer leads to the same advantages as thermal contact of the current conductors 5 to the afterburner 6.

In all the illustrated cases, thermal contact of the current diverters 5 can be achieved in which the diverters are routed through the hot gas or the cold air flow. It is likewise possible to achieve thermal contact by mounting the current diverters 5 on the housing of the corresponding components in a manner which makes thermal contact, but which achieves electrical insulation. Thermal contact with simultaneous electrical insulation can be achieved using materials such as ceramics or mica.

What is claimed is:

1. Fuel cell system, comprising:
a high temperature fuel cell stack with current diverters for current delivery,
at least one of a reformer and an afterburner, and
low temperature connecting elements that are connected to a downstream end of the current diverters,
wherein the current diverters are in thermal contact with the at least one of the reformer and afterburner at a location between the high temperature fuel cell stack and the low temperature connecting elements in a manner preventing heat from being dissipated from the high temperature fuel cell stack via the current diverters.

2. Fuel cell system, comprising:
a high temperature fuel cell stack with current diverters for current delivery,
at least one of a reformer and an afterburner, and
low temperature connecting elements that are connected to a downstream end of the current diverters,
wherein the current diverters are in thermal contact with the at least one of the reformer and afterburner at a location between the high temperature fuel cell stack and the low temperature connecting elements;
wherein said thermal contact comprises the current diverters running through an inner hot gas flow area of the at least one of the reformer and afterburner.

3. Fuel cell system, comprising:
a high temperature fuel cell stack with current diverters for current delivery,
at least one of a reformer and an afterburner, and
low temperature connecting elements that are connected to a downstream end of the current diverters,
wherein the current diverters are in thermal contact with the at least one of the reformer and afterburner at a location between the high temperature fuel cell stack and the low temperature connecting elements;
wherein said thermal contact comprises the current diverters being connected to a housing of the at least one of the reformer and the afterburner.

4. Fuel cell system as claimed in claim 1, wherein the fuel cell system further comprises a heat exchanger for preheating of air which is supplied to the high temperature fuel cell stack, and wherein the current diverters are in thermal contact with the heat exchanger between the at least one of the reformer and afterburner and the low temperature connecting elements.

5. Fuel cell system as claimed in claim 4, wherein said thermal contact of the current diverters with the heat exchanger is in an air flow area within the heat exchanger.

6. Fuel cell system as claimed in claim 4, wherein said thermal contact of the current diverters with the heat exchanger is by a connection to a housing of the heat exchanger.

7. Fuel cell system as claimed in claim 1, further comprising a voltage converter unit for converting voltage of current delivered from the high temperature fuel cell stack, the voltage converter unit being internally connected in the fuel cell system to the low temperature connecting elements.

8. Fuel cell system as claimed in claim 1, wherein said high temperature fuel cell stack is one of a solid oxide fuel cell (SOFC), which is operated at 800° C. to 1000° C., and a molten carbonate fuel cell (MCFC), which is operated at 650° C.

* * * * *